3,530,044
PURIFICATION OF VINYL OR ALLYL ACETATE BY TREATMENT WITH A LITHIUM COMPOUND DURING DISTILLATION AND WITH A SODIUM OR POTASSIUM SALT DURING EVAPORATION
Peter Edwin Horn, Norton-on-Tees, England, assignor to Imperial Chemical Industries Limited, London, England, a corporation of Great Britain
Filed Feb. 14, 1969, Ser. No. 799,233
Claims priority, application Great Britain, Mar. 4, 1968, 10,289/68
Int. Cl. B01d 3/34; C07c 67/06
U.S. Cl. 203—7        9 Claims

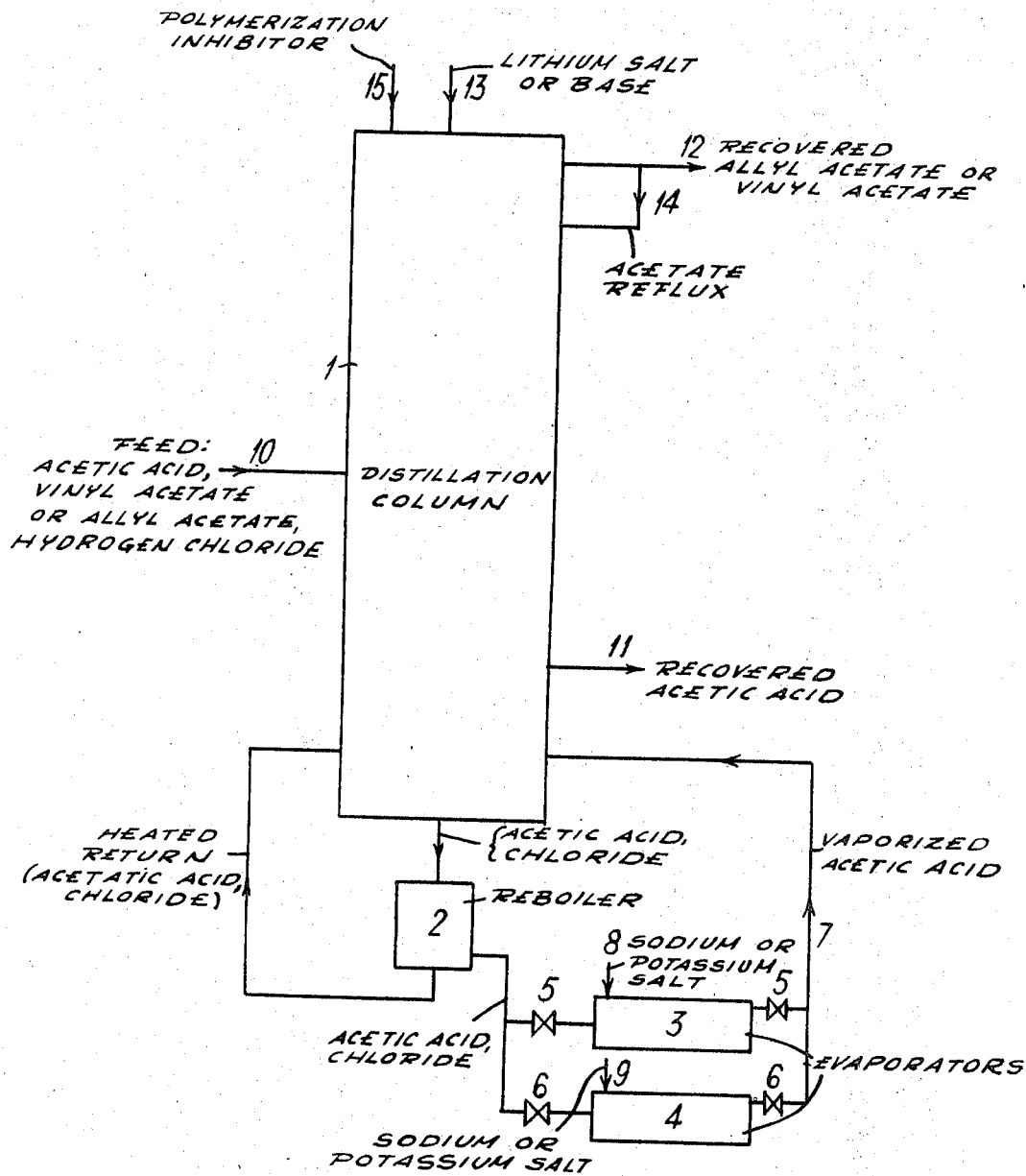

ABSTRACT OF THE DISCLOSURE

Mixtures of vinyl or allyl acetate and acetic acid containing hydrogen chloride are distilled in a column, a lithium salt being added at the column top and a purge being taken from the column base the purge being evaporated in the presence of a sodium or potassium salt to precipitate sodium or potassium chloride. If desired, the lithium may be recovered from the evaporator purge by water extraction.

---

The present invention relates to the distillation of unsaturated esters, in particular to the distillation of vinyl acetate and allyl acetate.

In British patent specification No. 964,001 there is described and claimed a process for the production of unsaturated esters such as vinyl acetate or allyl acetate which comprises contacting an alpha-olefine such as ethylene or propylene with a palladium salt, either under substantially anhydrous conditions or in the presence of a minor amount of water as defined and in the presence of a carboxylic acid such as acetic acid, carboxylate ions such as acetate ions, a redox system and molecular oxygen. It is also said to be advantageous to carry out the process in the presence of an alkali metal halide such as lithium chloride.

Apart from the use of lithium chloride the palladium salt may be palladous chloride and the redox system copper chloride. The effect of chloride ion on the process although beneficial in respect of reaction rate gives rise to the formation of hydrogen chloride and/or chlorinated organic by-products, e.g. ethylene chlorhydrin and 2-chloro-ethyl acetate, which under hydrolytic conditions hydrolyse to hydrogen chloride. Hydrogen chloride is particularly disadvantageous because of its corrosive effect on both mild steel and stainless steel and because it has a catalytic effect enhancing the hydrolysis of the unsaturated ester.

The present invention is concerned with mitigating the deleterious effect of hydrogen chloride in a process in which a mixture of vinyl or allyl acetate and acetic acid is separated by distillation. In particular the process is applicable to such a mixture arising as a product of the process described in British patent specification No. 964,001.

According to the invention a process for the distillation of a mixture of acetic acid with vinyl acetate or with allyl acetate which mixture contains hydrogen chloride or chlorine containing compounds capable of giving rise to hydrogen chloride comprises distilling the mixture in a distillation column, removing material from the base of the column, evaporating this material in the presence of a sodium or potassium salt, and introducing a lithium salt to the top of the column.

Preferably the evaporated vapours comprising acetic acid are returned to the column.

At least part of the hydrogen chloride is precipitated as sodium or potassium chloride in an evaporator in which the evaporation takes place.

The vinyl acetate or allyl acetate/acetic acid mixture may contain other components providing these latter do not exercise an adverse effect on the process. Thus in a process as described in specification No. 964,001 above, the product of the process which is submitted as feed to the distillation process of the present invention may comprise water, acetaldehyde, methyl acetate, ethylene glycol diacetate and ethylidene diacetate as well as other products. The chlorine content of the mixture may be up to 0.5% by weight or more and this may comprise organic chlorine compounds particularly organic chlorine compounds which are hydrolysable by water to give rise to hydrogen chloride. Typically a feed mixture for the process of the present invention comprises 15–30% by weight vinyl acetate, 40 to 65% by weight acetic acid and the balance water, acetaldehyde and hydrolysable chlorine-containing impurities.

The vinyl acetate or allyl acetate/acetic acid mixture is suitably introduced at the approximate mid-point of the distillation column and vinyl acetate or allyl acetate taken off at the top and acetic acid at the bottom of the column. Other high boiling esters such as ethylene glycol diacetate and ethylidene diacetate if these be present pass down the column and may be removed with the acetic acid. When vinyl acetate is the ester to be separated the column head temperature is usually 73° C., i.e. the boiling point of vinyl acetate under the preferred operating pressure which is atmospheric pressure. The column head temperature may be less than this figure however depending on whether or not other low boiling components such as acetaldehyde are present in the feed mixture. In the presence of water vinyl acetate forms an azeotrope boiling point 66° C. and this becomes the approximate column head temperature. Similarly with allyl acetate the column head temperature may be 103° C., the boiling point of allyl acetate or 83° C. the boiling point of the allyl acetate/water azeotrope. The temperature at the base of the column is suitably about the boiling point of acetic acid i.e. 118° C. but as it is preferred to remove the acetic acid as a sidestream some distance from the exact bottom of the column the column base temperature may be some few degrees above this e.g. 125° to 160° C.

The distillation column is preferably provided with a reboiler which is fed from the base of the column with material which is heated and returned to the column in continuous circulation. Provision may then be made to withdraw part of the material from the reboiler either intermittently or preferably continuously and to feed it to the evaporator. The vapours from the evaporator are largely acetic acid and these may be fed back to the distillation column. A solid residue which is obtained in the evaporator consists essentially of sodium chloride or potassium chloride. The evaporator may be operated at a temperature in the range 120° to 200° C. particularly 135° to 150° C. and preferably at atmospheric pressure.

The lithium salt introduced in the top of the column is a salt capable of giving rise to lithium chloride in contact with hydrogen chloride. Lithium carbonate or a lithium carboxylate e.g. an alkanoate containing up to six carbon atoms such as lithium acetate may be used, but lithium hydroxide which is readily available is most conveniently employed. The lithium salt may be added in a molar amount up to five times the molar amount of hydrogen chloride present. Preferably however the molar amount of lithium salt is about twice the molar amount of hydrogen chloride present. The lithium salt is preferably added continuously.

The sodium or potassium salt which is introduced to the evaporator is a salt capable of giving rise to sodium or potassium chloride in contact with lithium chloride.

Although sodium or potassium carbonate or sodium or potassium carboxylates e.g. alkanoates containing up to six carbon atoms such as sodium acetate may be used, for reasons of convenienue the hydroxides, particularly sodium hydroxide are preferred. The sodium or potassium salt which is preferably introduced continuously may be added in a molar amount up to five times the molar amount of hydrogen chloride present, preferably in a molar amount about twice the molar amount of hydrogen chloride present.

The removal of the solid residue from the evaporator is not easily carried out when the evaporator is being continuously fed with material from the base of the column. In a preferred form of the invention therefore two evaporators are provided each being capable of being isolated from the distillation column at will. One evaporator is thus in use while the other is being cleaned out and the change from the one to the other may take place without disruption of the process.

The unsaturated esters which comprise the feedstock of the process of the present invention both polymerise readily. To avoid this polymerisation taking place in the distillation column it is preferred to provide for a polymerisation inhibitor e.g. hydroquinone in the distillation column.

Without wishing to be limited in any way by the following explanation we believe that the lithium salt reacts with hydrogen chloride in the distillation column to form lithium chloride which passes down the column and thence to the evaporator. Unlike sodium and potassium chlorides lithium chloride is soluble in acetic acid and hence does not precipitate in the distillation column (or reboiler). In the evaporator the lithium chloride undergoes a double decomposition reaction with the sodium or potassium salt (usually in the form of sodium or potassium acetate because of the acetic acid medium) e.g.

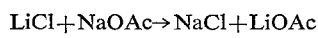

The sodium or potassium chloride being insoluble precipitates. The removal of chloride in this way minimises the reverse reaction

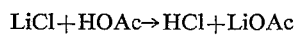

and also provides additional lithium acetate. By removing hydrogen chloride in this way the latter is prevented from catalysing the undesirable reaction referred to above and is also prevented from contaminating the vinyl acetate or allyl acetate and acetic acid products of the distillation.

The invention will now be further described with reference to the following example in which the distillation apparatus used is shown in the attached diagram.

EXAMPLE

The distillation apparatus comprised a column 1, reboiler 2 and twinned evaporators 3 and 4. The evaporators were provided with isolation valves 5 and 6, a common vapour return line 7 and facilities for continuously adding sodium salt 8 and 9 respectively. A feed inlet line 10 was provided to the column and also acetic acid and vinyl acetate removal lines 11 and 12 respectively. Vinyl acetate was fed back to the column as reflux through line 14. Means for introducing the lithium salt 13 and hydroquinone 15 were provided at the top of the column.

The feed mixture was derived from the palladium catalysed oxidation of ethylene in the presence of oxygen, acetic acid, lithium acetate, lithium chloride and copper chloride as described in British patent specification No. 964,001 and comprised vinyl acetate 25%, acetaldehyde 15%, water 12%, by-products approximately 21%, the balance being acetic acid (the percentages being by weight).

The mixture was introduced to the column at a temperature of 60–80° C., the column head temperature was 63° C. and the column base temperature 135° C. under atmospheric pressure. A vinyl acetate/water azeotrope was removed through line 12 and acetic acid through line 11. Material was circulated continuously through the reboiler 2 from which a purge was taken to one of the two evaporators. Each evaporator was capable of being isolated by means of the valves 5 or 6 while its twin was in operation. The evaporators were heated to 140–145° C. and the vapours removed via 7 and returned to the column. Periodically the evaporators were changed over and the solid deposit removed. This deposit consisted essentially of sodium chloride. The feed rate was 1500 mls./hour and a 1 molar aqueous solution of lithium hydroxide was introduced continuously through line 13 at a rate of 30–50 mls./hour. A 5 molar sodium hydroxide solution was continuously metered to the evaporators at a rate of 10 mls./hour through line 8 or 9. Hydroquinone was introduced through line 15 to stabilise the vinyl acetate during the distillation. The chloride contents of the vinyl acetate and acetic acid removed from the still were less than 20 p.p.m. The chloride content of the material circulating through the reboiler was maintained at less than 0.06 molar.

What is claimed is:

1. In a process for separating acetic acid from vinyl acetate or allyl acetate by the distillation of a mixture of said acetic acid with said vinyl acetate or with said allyl acetate wherein said mixture contains hydrogen chloride or chlorine containing compounds capable of giving rise to hydrogen chloride, the improvement which comprises distilling the mixture in a distillation column, to obtain a distillate containing the acetate from the top of the column and recovering acetic acid from the bottom of said column, removing unvapourized material from the base of the column, evaporating this removed material in the presence of a sodium or potassium salt to vapourize acetic acid therein and to remove chloride, and introducing a lithium salt or lithium hydroxide into the top of the column to convert said hydrogen chloride to lithium chloride in the column.

2. The process of claim 1 in which the evaporated vapours are returned to the column.

3. The process of claim 2 in which the lithium salt is lithium carbonate or lithium acetate and said salt or lithium hydroxide is added in a molar amount up to five times the molar amount of hydrogen chloride present.

4. The process of claim 3 in which the sodium or potassium salt is sodium or potassium carbonate, sodium or potassium acetate or sodium or potassium hydroxide added in a molar amount up to five times the molar amount of hydrogen chloride present.

5. The process of claim 1 in which the evaporation is carried out at a temperature in the range 120° to 200° C.

6. The process of claim 1 in which the column base temperature is 125° to 160° C.

7. The process of claim 1 in which material is taken from the base of the column, heated, and returned to the column in continuous circulation.

8. The process of claim 7 in which material is continuously removed for evaporation from that circulating to the base of the column.

9. Apparatus for separating acetic acid and vinyl acetate or allyl acetate from mixtures thereof by distillation which comprises a distillation column, means for feeding the mixture to be distilled into said column at a point intermediate the top and bottom thereof, means for removing vapourized vinyl or allyl acetate from near the top of said column, means for removing acetic acid from a point near the bottom of said column, means for withdrawing a portion of the nonvolatilized material from the bottom of said distillation column, a reboiler for receiving and heating said withdrawn material and means for returning a portion of said heated material back to the bottom of said column, a pair of evaporators, means for supplying the balance of said heated material from said reboiler to said evaporators, means for returning material vapourized in said evaporators to said column and means for isolating first one of said evaporators and then the other from said reboiler and column.

References Cited

UNITED STATES PATENTS

| | | | |
|---|---|---|---|
| Re. 25,393 | 6/1963 | Bechtel | 203—13 |
| 722,071 | 3/1903 | Ahlers | 202—270 |
| 2,081,189 | 5/1937 | Wiezevich | 203—33 |
| 2,463,453 | 3/1949 | Beardsley | 203—33 |
| 3,346,626 | 10/1967 | Schaeffer et al. | |

FOREIGN PATENTS

| | | |
|---|---|---|
| 969,018 | 9/1964 | Great Britain. |
| 1,053,421 | 1/1967 | Great Britain. |
| 1,064,491 | 4/1967 | Great Britain. |

WILBUR L. BASCOMB, JR., Primary Examiner.

U.S. Cl. X.R.

202—155; 203—8, 33, 37, 38, 84, 96, 99; 260—497, 499, 541